(12) United States Patent
Seo

(10) Patent No.: US 6,819,869 B2
(45) Date of Patent: Nov. 16, 2004

(54) THREE-DIMENSIONAL IMAGE-CAPTURING DEVICE AND ADAPTER FOR THREE-DIMENSIONAL IMAGE-CAPTURING

(75) Inventor: Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/268,758

(22) Filed: Oct. 11, 2002

(65) Prior Publication Data

US 2003/0072569 A1 Apr. 17, 2003

(30) Foreign Application Priority Data

Oct. 15, 2001 (JP) .................................... P2001-316337

(51) Int. Cl.[7] .......................... G03B 35/00; G03B 41/00
(52) U.S. Cl. ...................................... 396/331; 396/333
(58) Field of Search ................................ 396/331, 324, 396/199, 333, 544, 351; 355/7; 352/57, 65; 359/462, 477; 348/42, 54

(56) References Cited

U.S. PATENT DOCUMENTS

| | | | |
|---|---|---|---|
| 5,570,150 A | 10/1996 | Yoneyama et al. | 396/324 |
| 5,581,314 A | 12/1996 | Yoneyama et al. | 396/331 |
| 6,674,893 B1 * | 1/2004 | Abe et al. | 382/154 |
| 2002/0044682 A1 * | 4/2002 | Weil et al. | 382/154 |

FOREIGN PATENT DOCUMENTS

| | | |
|---|---|---|
| JP | 00152282 | 5/2000 |
| JP | 02152779 | 5/2002 |

* cited by examiner

*Primary Examiner*—David Gray
*Assistant Examiner*—Rochelle Blackman
(74) *Attorney, Agent, or Firm*—Greenblum & Bernstein, P.L.C.

(57) ABSTRACT

A three-dimensional image-capturing device using a pattern projection method is provided. The device is comprised of a camera and an adapter mounted on the lens barrel of the camera. The first-half area of the camera's CCD captures a pattern image in the invisible range. The second-half area of the CCD captures a texture image in the visible range. The adapter bifurcates the light path of the camera into first and second light paths. A first filter cuts off visible light rays and is disposed in the first light path. A second filter cuts off invisible light rays and is disposed in the second light path. The first and second light paths lead light to the first and second-half areas, respectively. A pattern and texture image are captured simultaneously while a predetermined pattern in the invisible range is projected onto a subject from a pattern projection device of the adapter.

18 Claims, 5 Drawing Sheets

THREE-DIMENSIONAL IMAGE-CAPTURING DEVICE AND ADAPTER FOR THREE-DIMENSIONAL IMAGE-CAPTURING

BACKGROUND OF THE INVENTION

1. Field of the Invention

The present invention relates to a three-dimensional image-capturing device that obtains three-dimensional information of a subject by means of a pattern projection method.

2. Description of the Related Art

In the art of three-dimensional photography, a pattern projection method is conventionally known in which the three-dimensional shape of a subject is obtained by means of capturing an image of the subject to which a pattern is projected by a camera. The pattern is produced by light that is emitted through slits from a light source of which the position and direction are known with respect to the camera. In a conventional pattern projection method, a pattern image with the projected pattern on the subject and a color still image (or texture image) without the pattern projection are individually captured in sequence. Note that, a pair of images comprised of a pattern image and texture image will be referred to as a three-dimensional image in the following.

However, in the above pattern projection method of the three-dimensional image-capturing device, it takes time to capture a three-dimensional image since the pattern image and the texture image are individually captured in sequence. Therefore, in some cases, such as when a subject is moving, it is impossible to capture a three-dimensional image. Further, in the pattern projection method, the position and the direction of the light source with respect to a camera also should be known in advance, so that arrangement of the camera and the light source is extremely cumbersome.

SUMMARY OF THE INVENTION

Therefore, an object of the present invention is to provide a three-dimensional image-capturing device and an adapter that enables convenient and prompt image-capturing operation by means of a pattern projection method.

According to the present invention, a three-dimensional image-capturing device using a pattern projection method is provided that comprises a first image capturing part, a second image capturing part, a first optical element, a second optical element, and a pattern projection device.

The first image capturing part captures a pattern image produced by light in a first range. The second image capturing part captures a texture image produced by light in a second range which is dissimilar to the first range. The first optical element selectively cuts off light in the second range and it is disposed in a first light path through which light rays received in the first image capturing part pass. The second optical element selectively cut off light in the first range and it is disposed on a second light path through which light rays received in the second image capturing part pass. The pattern projection device projects a predetermined pattern onto a subject by means of light in the first range. The pattern and texture images are captured simultaneously while the predetermined pattern is projected onto the subject.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiments shown in the drawings.

Figure 1:
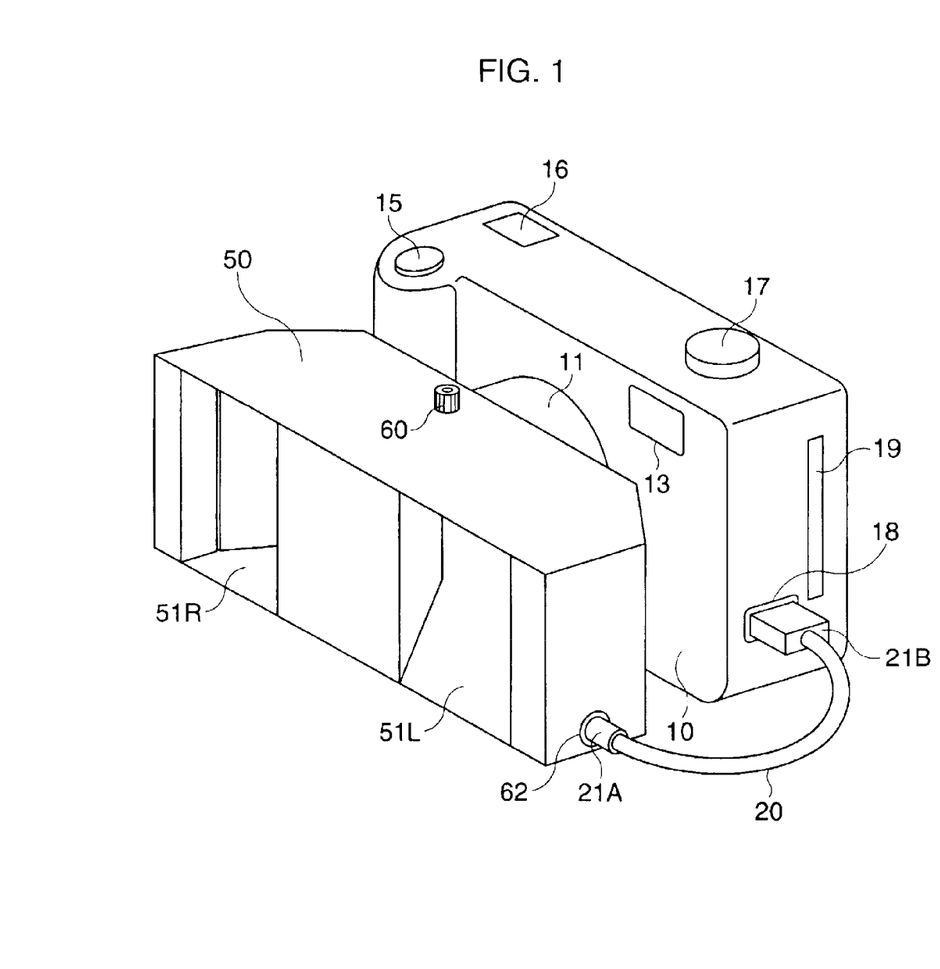
FIG. 1 is a perspective view of a three-dimensional image-capturing device of an embodiment of the present invention.

FIG. 1 is a perspective view of a three-dimensional image-capturing device of an embodiment of the present invention. With reference to FIG. 1, the embodiment will be explained in the following.

A (objective) viewfinder 13 is provided at the upper left corner of a front surface of a camera body 10, the surface with the photographing lens barrel 11. A release switch 15 and a liquid crystal display panel 16 are provided on the left side of the upper surface of the camera body 10, while a mode dial 17 is provided on the right side. An interface connector 18 and a card slot 19 into which a storage medium (not shown) such as an IC memory card may be inserted, are formed on a side surface of the camera body 10.

In front of the lens barrel 11, an adapter 50 for the pattern projection is detachably attached through a mount (not shown). Respective openings 51L and 51R are formed in each of the left and right sides of the pattern projection adapter 50. As will be described later, the light path of the lens barrel 11 is bifurcated by mirrors in the pattern projection adapter 50 (see FIG. 2) and the light is guided from the respective openings through the optical system. Further, a mirror-adjusting dial 60 for adjusting the angles of the rotating mirrors (see FIG. 2), which will be explained later, is provided at the center of the upper surface of the pattern projection adapter 50. An interface connector 62 is provided on a side of the pattern projection adapter 50 and a connector 21A of an interface cable 20 is detachably connected to the connector 62. The other side of the connector 21B of the interface cable 20 is detachably connected to the interface connector 18 of the camera body 10.

Figure 2:
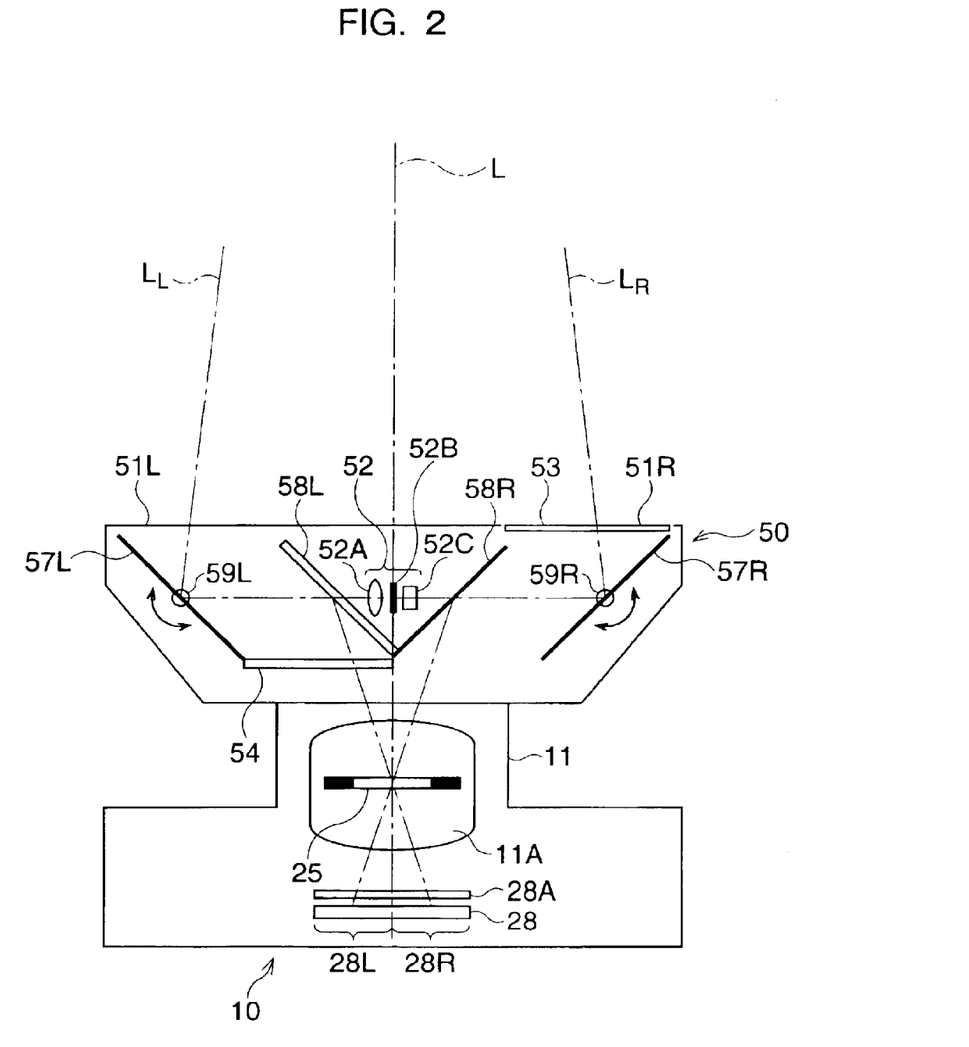
FIG. 2 illustrates the optical construction of the three-dimensional image-capturing device shown in FIG. 1.

FIG. 2 schematically illustrates the optical structure of the three-dimensional image-capturing device in FIG. 1.

Inside the lens barrel 11 of the camera 10, a photographing optical system 11A is provided that comprises an aperture 25 (such as an iris stop). On the optical axis L of the photographing optical system 11A, a color filter array 28A and an imaging device 28 (such as CCD) are disposed so as to be perpendicular to the optical axis L. In the pattern projection adapter 50, rotatable mirrors 57R and 57L (first and second rotatable mirrors) are arranged symmetrically with respect to the optical axis L. The respective rotatable mirrors 57R and 57L are rotatable about axes 59L and 59R, which are arranged perpendicular to the optical axis L, and the rotating angles of the mirrors are symmetrical with respect to the optical axis L. The pattern projection adapter 50 also has fixed mirrors 58R and 58L (first and second fixed mirrors). The fixed mirrors 58R and 58L are oppositely disposed against the respective rotatable mirrors 57R and 57L, and are symmetrically arranged with respect to the optical axis L, at an angle of 135 degrees. Namely, a side of the fixed mirror 58L comes into contact with a side of the fixed mirror 58R at a right angle. Further, the reflecting surfaces of the rotatable mirrors 57R and 57L face the respective reflecting surfaces of the fixed mirrors 58R and 58L. Namely, the light path of the photographing optical system 11A is bifurcated to the right path (first light path) and left light path (second light path) by the fixed mirrors 58R and 58L, and the respective light paths are guided to each of the openings 51R and 51L via the rotatable mirrors 57R and 57L.

At the opening 51R, which is the entrance of the right light path, a visible ray cut off filter 53 (first optical element) that absorbs light rays in the visible range (second light range) is provided. Further, at the exit of the left light path, between the fixed mirror 58L and the photographing optical system 11A, an invisible rays cut off filter (second optical element), such as an infrared cut off filter 54, which absorbs light rays in the infrared range or the invisible range (first light range) is provided. Namely, light made incident to the left opening 51L of the pattern projection adapter is at first reflected by the rotatable mirror 57L and the fixed mirror 58L toward the photographing optical system 11A via the infrared cut off filter 54, thereby the incident light is lead to the photographing optical system 11A and then received by the right-half area (second image capturing part) of a CCD (imaging device) 28 of the stereo camera 10. Similarly, light made incident to the right opening 51R of the pattern projection adapter 50 via the visible ray cut off filter is at first reflected by the rotatable mirror 57R and the fixed mirror 58R toward the photographing optical system 11A, thereby the incident light is received by the left-half area (first image capturing part) of the CCD 28 through the photographing optical system 11A.

In FIG. 2, the principal ray $L_L$ (second principal ray) that penetrates the center of the right-half area 28R of the CCD 28 and the principal ray $L_R$ (first principal ray) that penetrates the center of the left-half area 28L of the CCD 28 are illustrated. The principal ray $L_L$ from the right-half area 28R is reflected at approximately the center of the fixed mirror 58L toward the rotatable mirror 57L, and is then reflected toward a subject in accordance with the angle of the rotatable mirror 57L. Similarly, the principal ray $L_R$ from the left-half area 28L is reflected at approximately the center of the fixed mirror 58R toward the rotatable mirror 57R, and is then reflected toward the subject in accordance with the angle of the rotatable mirror 57R. Note that, the angles of the rotatable mirrors 57L and 57R are adjusted in accordance with the distance to the subject. Further, from the above construction, the first and second principal rays are symmetrical with respect to the optical axis L.

For example, the fixed mirror 58L is a dichroic mirror that transmits light rays in the infrared range or the invisible range and reflects light rays in the visible range. On the opposite side of the surface that reflects the principal ray $L_L$, a projection device 52 is provided for projecting a pattern on the subject. The projection device 52 is comprised of a lens system 52A, a pattern projection filter 52B (ex. filter with a striped pattern or slits), and a light-emitting device 52C (ex. LED). The light-emitting device 52C is a light source that emits invisible light rays, such as infrared rays. The optical axis (or the center line of pencil rays from the light source) of the lens system 52A coincides with the principal ray $L_L$ between the fixed mirror 58L and the rotatable mirror 57L. Therefore, infrared or invisible rays emitted from the projection device 52 transmit through the fixed mirror 58L and are then divergently irradiated along the principal ray $L_L$, so that a striped pattern of infrared rays, for example, is projected on the surface of the subject.

Since the infrared cut off filter 54 is provided in the left light path of the pattern projection adapter 50, only rays in the visible range are received by the right-half area 28R of the CCD 28, SO that a subject image in the visible range is produced in the area 28R as a texture image. On the other hand, since the visible rays cut off filter 53 is provided on the right light path of the pattern projection adapter 50, only rays in the infrared or invisible range are received by the left-half area 28L of CCD 28, SO that a subject image with a striped pattern is produced on the area 28L as a pattern image.

Figure 3:
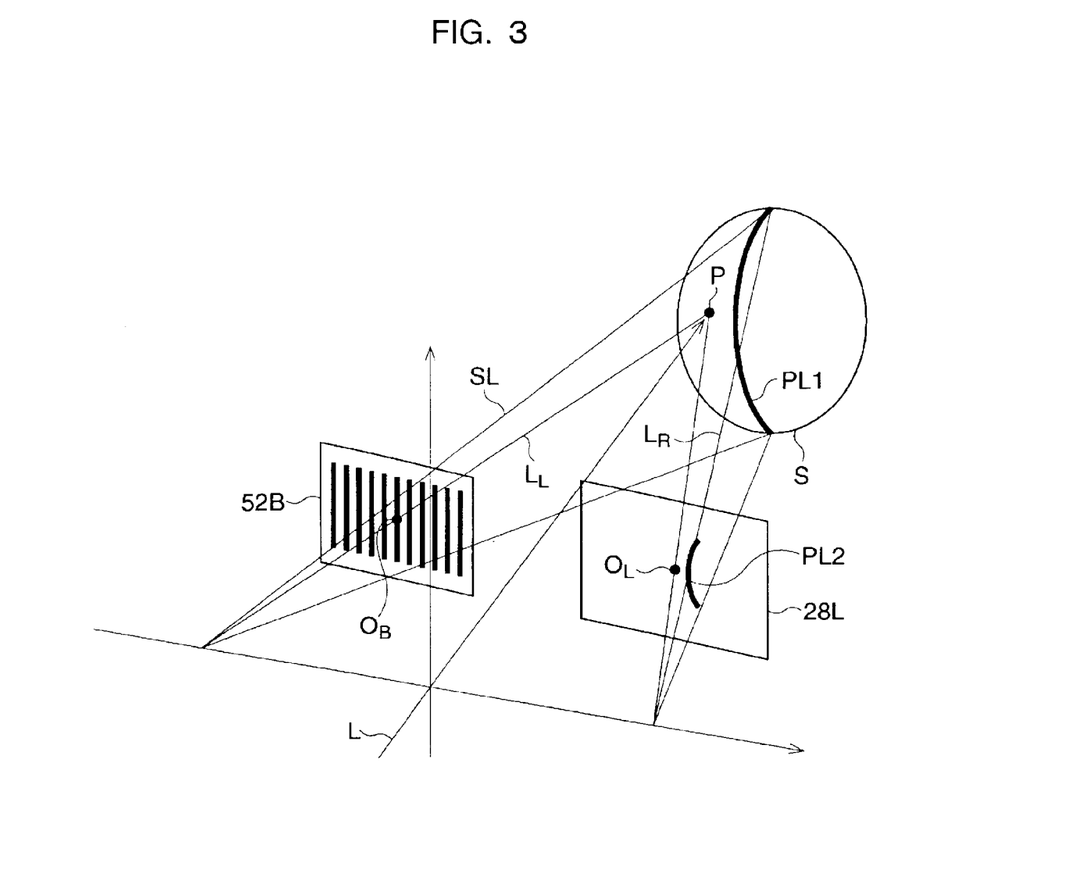
FIG. 3 schematically illustrates the principle of the pattern projection method applied in the present embodiment.

FIG. 3 schematically illustrates the pattern image capturing principle applied in the present embodiment. The principal rays $L_L$ and $L_R$ are coordinated so as to intersect at a point P on the subject S by the mirror-adjusting dial 60. In the present embodiment, the point P is on the optical axis L of the photographing optical system 11A. Since the optical axis of the projection device 52 coincides with the principal ray $L_L$, a projected pattern on the subject can be regarded as if it is projected by light rays from the light source of the principal ray $L_L$ through a pattern projection filter (which is identical to the pattern projection filter 52B), in principle. A striped pattern corresponding to the pattern projection filter 52B is projected on the surface of the subject, so that the image of the pattern is produced on the left-half area 28L of the CCD 28; the left-half area being arranged in the path of the principal ray $L_R$ so that it captures the pattern image. The position and the direction of the light source with respect to the left-half area 28L, on which a pattern image is captured, are calculated in accordance with the angles of the rotatable mirrors 57L and 57R which are detected by a mirror angle detector 61. Namely, the three-dimensional shape of the subject S can be calculated from the pattern image by means of a conventionally known pattern projection method. Note that, for convenience, only one curved line PL1 on the subject S that corresponds to a slit SL, and the image PL2 on the left-half area 28L, which corresponds to the image of the line PL1, are illustrated in the figure.

Figure 4:
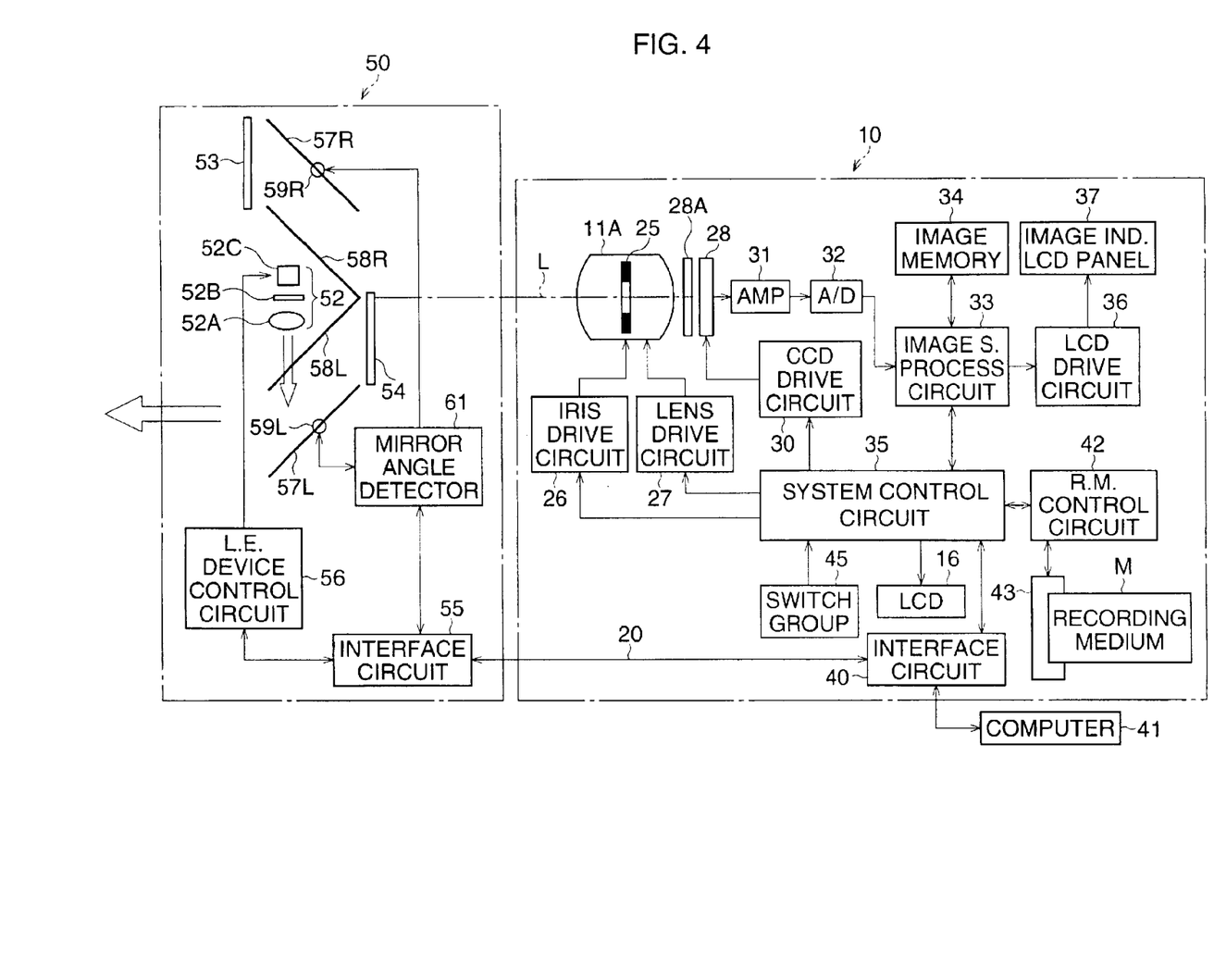
FIG. 4 is a block diagram showing the electrical construction of the three-dimensional image-capturing device.

FIG. 4 is a block diagram showing an electrical construction of the three-dimensional image-capturing device shown in FIGS. 1 and 2.

The light-emitting device 52C is controlled by a light emitting device control circuit 56 in the pattern projection adapter 50. The light-emitting device control circuit 56 is driven by a system control circuit 35 via interface circuits 55 and 40 when the release switch 15 of the camera 10 is depressed. The interface circuit 55 is connected to the interface circuit 40 provided inside the camera body 10 through the interface cable 20, as shown in FIG. 1. Note that, the interface circuit 55 is connected to the connector 62 (not shown in FIG. 4 but in FIG. 1) and the connector 21A of the interface cable 20 is detachably fitted into the connector 62.

The light made incident to the pattern projection adapter 50 is led to the CCD 28 through the photographing optical system 11A of the camera body 10. The opening degree of an aperture 25 (ex. an iris stop) provided inside the photographing optical system 11A is adjusted by an iris drive circuit 26. A focusing operation and a zoom operation of the photographing optical system 11A are controlled by a lens drive circuit 27.

A subject image is formed on a light receiving surface of the CCD 28 through the photographing optical system 11A, and an electric charge corresponding to the subject image is generated therein. An operation, such as an accumulating operation and a reading operation of the electric charge of the CCD 28, is controlled by a CCD drive circuit 30. An electric charge signal, i.e., an image signal, read from the CCD 28 is amplified by an amplifier 31, and is converted from an analog signal to a digital signal by an A/D converter 32. The digital image signal is subjected to a process, such as a gamma correction, in the image signal process circuit 33, and is temporally stored as digital image data in an image memory 34. The iris drive circuit 26, the lens drive circuit 27, the CCD drive circuit 30, and the image signal process circuit 33 are controlled by a system control circuit 35.

The digital image data are read from the image memory 34, and supplied to an LCD drive circuit 36. The LCD drive circuit 36 is operated in accordance with the digital image data, so that an image corresponding to the digital image data is indicated on an image indication LCD panel 37.

The system control circuit 35 is connected to an interface circuit 40 and the connector 18 (see FIG. 1) is connected to the interface circuit 40. Namely, when the pattern projection adapter 50 is mounted on the lens barrel 11 for three-dimensional image capturing, the interface circuits 40 and 55 are interconnected by the interface cable 20. Further, the connector 18 may be connected to a computer 41, whereby the digital image data stored in the image memory 34 can be transmitted to the computer 41. The system control circuit 35 is connected to an image recording device 43 through a recording medium control circuit 42. Therefore, the digital image data read from the image memory 34 can be recorded in a recording medium M, such as an IC memory card, attached to the image recording device 43.

The liquid crystal display panel 16 and a switch group 45, including the release switch 15 and the mode dial 17, are connected to the system control circuit 35.

When the release switch 15 is depressed, the light-emitting control circuit 56 is driven by the system control circuit 35 via the interface circuit 40 and 55, and the light source 52C is turned on. Simultaneously, the angles of the rotatable mirrors 57L and 57R are detected by the mirror angle detector 61 and the angle data is sent to the system control 35. The angle data are recorded in the recording medium M with the image data (data for a pattern image and a texture image), which are captured subsequently.

Figure 5:
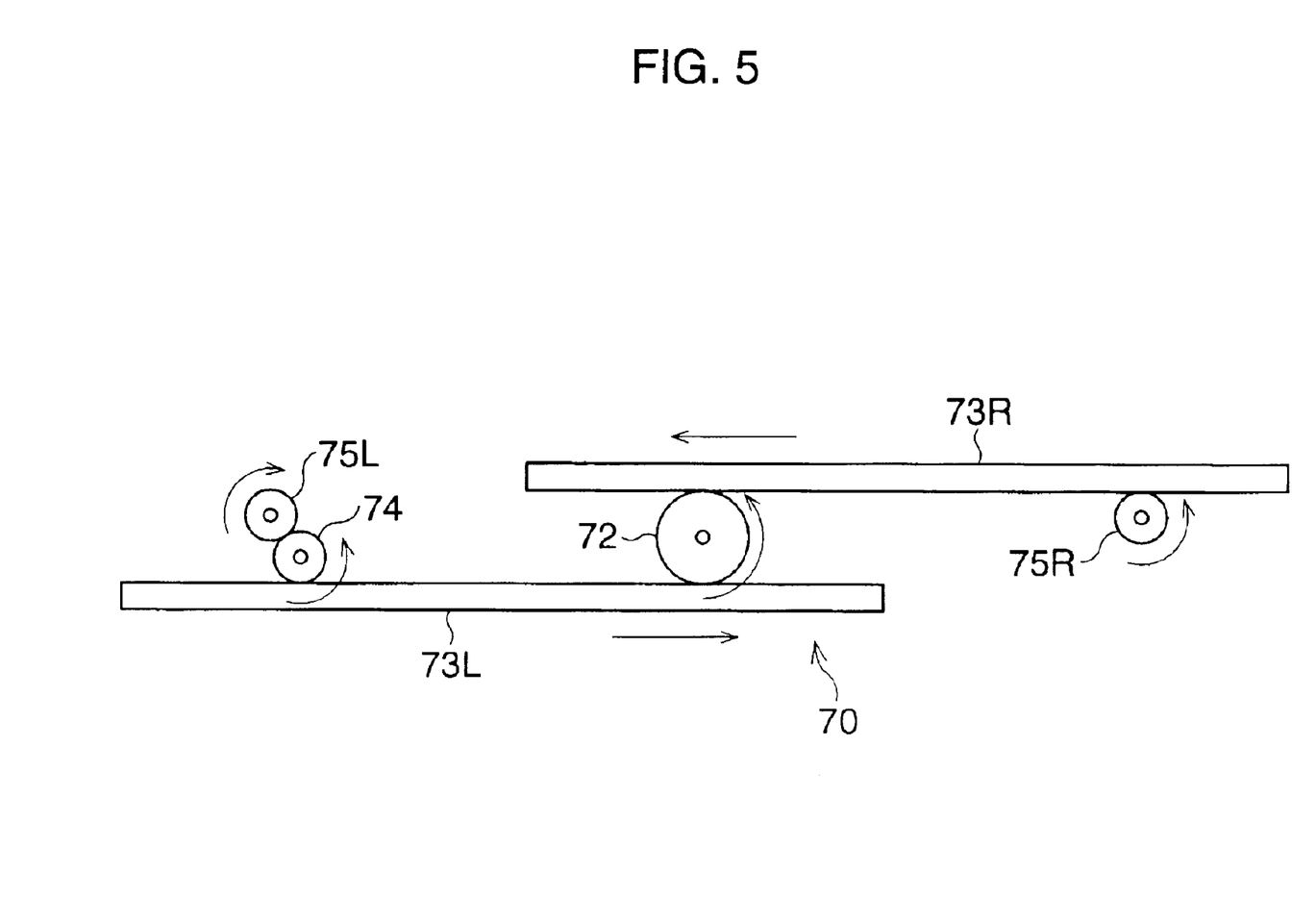
FIG. 5 schematically illustrates the construction of a rotatable mirror drive mechanism applied in the present embodiment.

Next, a driving mechanism of the rotatable mirrors 57L and 57R will be explained with reference to FIG. 5. FIG. 5 schematically illustrates a construction of the rotatable mirror driving mechanism 70 in the present embodiment.

The drive shaft of the gear wheel 72 in FIG. 5 is connected to the mirror-adjusting dial 60, so that the gear wheel 72 is rotated by a turning operation of the mirror-adjusting dial 60, which will be carried out by an operator. The gear wheel 72 engages with each of the racks 73L and 73R on opposite sides with reference to the drive shaft. Namely, teeth on the right side of the rack 73L and the left side of the rack 73R respectively engage with the gear wheel 72 and the racks 73L and 73R are arranged substantially parallel to one another with the gear wheel 72 between them. The teeth on the left side of the rack 73L engage with a pinion 74 and the teeth on the rack 73R engage with a pinion 75R. Further the pinion 74 engages with the pinion 75L. The axes of each pinion 75L and 75R are arranged symmetrically with respect to the axis of the gear wheel 72 and are connected to the axes of each rotatable mirror 57L and 57R. Further radii and pitches of each pinion 74, 75L, and 75R are the same. Therefore, the angles of the rotatable mirrors 57L and 57R are controlled to be symmetrical with respect to the optical axis L by a rotational operation of the mirror-adjusting dial 60. For example, when the gear wheel 72 is rotated in the counter clockwise direction, as shown in FIG. 5, the rack 73L is horizontally translated in the right direction and the rack 73R is horizontally translated in the left direction. At this time, the pinions 74 and 75R are rotated in the counter clockwise direction and the pinion 75L is rotated in the clockwise direction by the same amount of angle as the pinion 75R.

As described above, according to the present embodiment, a three-dimensional image can be easily and swiftly obtained by means of a pattern projection method. Namely, the pattern projection method can be used without providing an extra or external light source for the pattern projection and without measuring the position and direction of the light source with respect to the camera. The pattern projection method can be used by simply mounting the pattern projection adapter onto the lens barrel. Further, a pattern image and a texture image are simultaneously captured since a pattern image is captured through a visible rays cut off filter and a texture image is captured through an invisible rays cut off filter (or an infrared cut off filter) while the invisible rays are irradiated from the light source.

In the present embodiment, as is similar to a stereo adapter, the pattern projection adapter bifurcates the single photographing system of the camera and enables the simultaneous capturing of a pattern and texture image pair with the camera. Since the embodiment is structured as an adapter type, the embodiment can be easily applied to a conventional digital camera. Further, according to the present embodiment, the optical axis of the light source for the pattern projection coincides with the principal ray from the center of the texture image, and the angles of the rotatable mirrors can be adjusted for the principal rays of a texture image and a pattern image to intersect at a point on the subject, so that an appropriate pattern can be projected onto the subject.

Note that, in the present embodiment, although a pattern image and a texture image are captured by a single imaging device in which the light receiving area is bisected for each image, an imaging device and/or an optical system may be individually provided for the texture image and for the pattern image.

In the present embodiment, the rotatable mirrors are manually adjusted, however, it may be automatically adjusted in combination with a distance measurement device. Further, the angles of the rotatable mirrors may be stored in the image memory or the recording medium with images captured by the camera. Further still, the rotatable mirrors can be replaced by fixed type mirrors.

In the present embodiment, although an LED is used for the light source of the projection device and the filter with the strip pattern is applied, a laser diode may be utilized in place of the LED and a diffraction grating may be applied in place of the pattern projection filter. Further, any range of invisible rays can be applied as the light source if it does not affect the texture image capturing. For example, the light source may radiate ultraviolet rays. In this case, an ultraviolet cut off filter will be disposed in the light path which is used for texture image capturing.

In the present embodiment, although the three-dimensional image-capturing system is comprised of a digital camera and a pattern projection adapter (which is mounted onto the lens barrel), these two elements may be integrally formed.

Further, since only the left-half area of the imaging device captures visible images, the color filter array need only be disposed on the left-half area of the imaging device.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2001-316337 (filed on Oct. 15, 2001) which is expressly incorporated herein, by reference, in its entirety.

What is claimed is:

1. A three-dimensional image-capturing device using a pattern projection method, comprising:

a first image capturer that captures a pattern image produced by light in a first range;

a second image capturer that captures a texture image produced by light in a second range which is different from said first range;

a first optical element that selectively cuts off light in said second range and that is disposed in a first light path through which light rays received by said first image capturer pass;

a second optical element that selectively cuts off light in said first range and that is disposed in a second light path through which light rays received by said second image capturer pass;

a pattern projector that projects a predetermined pattern onto a subject using light in said first range; and an optical-system adjuster that adjusts an intersection of a first principal ray from a center of said pattern image and a second principal ray from a center of said texture image to intersect on the subject;

wherein said pattern image and said texture image can be simultaneously captured while said predetermined pattern is projected onto the subject by said pattern projector.

2. The device according to claim 1, wherein said three-dimensional image-capturing device comprises a single photographing optical system and the light path of said photographing optical system is divided into said first light path and said second light path.

3. The device according to claim 2, further comprising a single imaging device that comprises said first image capturer and said second image capturer.

4. The device according to claim 2, wherein said first principal ray and said second principal ray are symmetric with respect to a predetermined plane that includes an optical axis of said photographing optical system.

5. The device according to claim 4, wherein said pattern projector is arranged so that a center line of the pencil rays formed by said pattern projector coincides with said second principal ray.

6. The device according to claim 5, further comprising:

a first fixed mirror and a second fixed mirror that are respectively arranged at predetermined angles with respect to said optical axis; and a first rotatable mirror and a second rotatable mirror that are arranged so as to respectively face said first and second fixed mirrors;

wherein said photographing optical system is bifurcated by said first and second fixed mirrors and said intersection of said first and second principal rays on said subject is adjusted by controlling said angles of said first and second rotatable mirrors.

7. The device according to claim 6, wherein said second fixed mirror comprises a dichroic mirror that transmits light in said first range and reflects light in said second range, and light from said pattern projector is irradiated through said second fixed mirror, and said center line coincides with said second principal ray which is reflected by said second fixed mirror.

8. The device according to claim 1, wherein said first range comprises an invisible range and said second range comprises a visible range.

9. The device according to claim 8, wherein said first range comprises the infrared range.

10. A three-dimensional image-capturing device using a pattern projection method, comprising:

a camera and a pattern projection adapter configured to be mounted on said camera;

said camera comprising:

a first image capturer that captures a pattern image produced by light in a first range; and a second image capturer that captures a texture image produced by light in a second range which is different from said first range;

said pattern projection adapter comprising:

a first optical element that selectively cuts off light in said second range and that is disposed in a first light path through which light rays received by said first image capturer pass;

a second optical element that selectively cuts off light in said first range and that is disposed in a second light path through which light rays received by said second image capturer pass;

a pattern projector that projects a predetermined pattern onto a subject using light in said first range; and an optical-system adjuster that adjusts an intersection of a first principal ray from a center of said pattern image and a second principal ray from a center of said texture image to intersect on the subject;

wherein said pattern image and said texture image can be simultaneously captured while said predetermined pattern is projected onto the subject by said pattern projector.

11. A pattern projection adapter configured to be mounted on a camera, the camera including a first image capturer that captures a pattern image produced by light in a first range and a second image capturer that captures a texture image produced by light in a second range which is different from said first range, said pattern projection adapter comprising:

a first optical element that selectively cuts off light in said second range and that is disposed in a first light path through which light rays received by the first image-capturer pass;

a second optical element that selectively cuts off light in said first range and that is disposed in a second light path through which light rays received by the second image capturer pass;

a pattern projector that projects a predetermined pattern onto a subject using light in said first range; and an optical-system adjuster that adjusts an intersection of a first principal ray from a center of said pattern image and a second principal ray from a center of said texture image to intersect on the subject;

wherein said pattern image and said texture image can be simultaneously captured while said predetermined pattern is projected onto the subject by said pattern projector.

12. The device according to claim 10, wherein said three-dimensional image-capturing device comprises a single photographing optical system and the light path of said photographing optical system is divided into said first light path and said second light path.

13. The device according to claim 12, further comprising a single imaging device that comprises said first image capturer and said second image capturer.

14. The device according to claim 12, wherein said first principal ray and said second principal ray are symmetric with respect to a predetermined plane that includes an optical axis of said photographing optical system.

15. The device according to claim 14, wherein said pattern projector is arranged so that a center line of the pencil rays formed by said pattern projector coincides with said second principal ray.

16. The device according to claim 15, further comprising:
    a first fixed mirror and a second fixed mirror that are respectively arranged at predetermined angles with respect to said optical axis; and
    a first rotatable mirror and a second rotatable mirror that are arranged so as to respectively face said first and second fixed mirrors;
    wherein said photographing optical system is bifurcated by said first and second fixed mirrors and said intersection of said first and second principal rays on said subject is adjusted by controlling said angles of said first and second rotatable mirrors.

17. The device according to claim 16, wherein said second fixed mirror comprises a dichroic mirror that transmits light in said first range and reflects light in said second range, light from said pattern projector is irradiated through said second fixed mirror, and said center line coincides with said second principal ray which is reflected by said second fixed mirror.

18. The device according to claim 10, wherein said first range comprises an invisible range and said second range comprises a visible range.

* * * * *